(12) United States Patent
Kaneko et al.

(10) Patent No.: US 12,221,186 B2
(45) Date of Patent: Feb. 11, 2025

(54) STRADDLED VEHICLE

(71) Applicant: YAMAHA HATSUDOKI KABUSHIKI KAISHA, Iwata (JP)

(72) Inventors: Kyohei Kaneko, Shizuoka (JP); Naoki Kitamura, Shizuoka (JP); Yasushi Takemoto, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 524 days.

(21) Appl. No.: 17/505,492

(22) Filed: Oct. 19, 2021

(65) Prior Publication Data
US 2022/0033027 A1 Feb. 3, 2022

Related U.S. Application Data

(63) Continuation-in-part of application No. PCT/JP2020/016384, filed on Apr. 14, 2020.

(30) Foreign Application Priority Data

Apr. 19, 2019 (JP) ................................ 2019-080270

(51) Int. Cl.
*B62K 11/04* (2006.01)
*B60K 6/46* (2007.10)
(Continued)

(52) U.S. Cl.
CPC ............... *B62K 11/04* (2013.01); *B60K 6/46* (2013.01); *B60L 50/10* (2019.02); *B62K 25/02* (2013.01); *B60Y 2200/12* (2013.01)

(58) Field of Classification Search
CPC . B60K 6/46; B60L 50/10; B60L 50/15; B60L 2270/142; B60L 2270/145;
(Continued)

(56) References Cited

U.S. PATENT DOCUMENTS

2003/0230440 A1* 12/2003 Kamen ................... B60L 50/61
903/905
2004/0035628 A1  2/2004 Takayanagi et al.
2013/0292198 A1 11/2013 Matsuda

FOREIGN PATENT DOCUMENTS

JP          S61187533 A     8/1986
JP         2001105899 A     4/2001
(Continued)

*Primary Examiner* — Tony H Winner
*Assistant Examiner* — Felicia L. Brittman-Alabi
(74) *Attorney, Agent, or Firm* — Rabin & Berdo, P.C.

(57) ABSTRACT

A straddled vehicle, including a vehicle frame structure, a drive unit including a drive motor that receives electric power and outputs driving power, a driving wheel that receives the driving power, and an electric power generation unit. The electric power generation unit includes an electric power generation engine configured to output engine power, and an electric power generator that is fixed to the electric power generation engine and is electrically connected to an electric power transfer medium having flexibility. The electric power generator is configured to convert the engine power into the electric power, and supply the electric power to the drive motor via the electric power transfer medium. The straddled vehicle is series-hybridized by the drive unit and the electric power generation unit. The electric power generation engine is swingably supported, independently of the drive unit, by the vehicle frame structure, such that the engine power is not mechanically supplied to the driving wheel.

12 Claims, 10 Drawing Sheets

(51) Int. Cl.
  *B60L 50/10* (2019.01)
  *B62K 25/02* (2006.01)
(58) Field of Classification Search
  CPC .... B60Y 2200/12; B62K 11/04; B62K 25/02;
      B62M 7/02; B62M 23/02; F02B 41/02;
      F02B 61/02; Y02T 10/62; Y02T 10/7072
  USPC .......................................................... 180/220
  See application file for complete search history.

(56) References Cited

FOREIGN PATENT DOCUMENTS

| | | | |
|---|---|---|---|
| JP | 2001106159 | A | 4/2001 |
| JP | 2004122854 | A | 4/2004 |
| JP | 2005231424 | A | 9/2005 |
| JP | 3992798 | B2 | 10/2007 |
| JP | 2018012346 | A | 1/2018 |
| WO | 2005063559 | A1 | 7/2005 |
| WO | 2012090243 | A1 | 7/2012 |
| WO | 2018057702 | A1 | 3/2018 |

* cited by examiner

STRADDLED VEHICLE

CROSS-REFERENCE TO RELATED APPLICATIONS

This is a continuation-in-part application of International Application PCT/JP2020/016384 filed on Apr. 14, 2020, which claims priority from a Japanese Application No. 2019-080270, filed on Apr. 19, 2019. The contents of the applications are incorporated herein by reference.

TECHNICAL FIELD

The present teaching relates to a straddled vehicle.

BACKGROUND ART

Patent Literature 1 (PTL 1) shows a straddled vehicle in which an engine unit including an engine and a gear case is fixed to a frame body. In the straddled vehicle, according to PTL 1, the engine unit is fixed to the frame body so as to constitute a frame structure, which results in the engine unit being a rigid member of the frame body.

CITATION LIST

Patent Literature

PTL 1: Japanese Patent No. 3992798

SUMMARY OF INVENTION

Technical Problem

In the straddled vehicle according to PTL 1, the engine unit is used as a rigid member of the frame body. This enhances the rigidity of the entire frame structure. Though this being so, vibration from the engine propagates to the entire straddled vehicle via the frame body as the engine unit is a fixture to the frame body.

In a straddled vehicle equipped with an engine, it is desired that vibration propagating from an engine unit to a frame body be suppressed even while a high responsiveness to an input is obtained.

The present teaching aims to provide a straddled vehicle having a high responsiveness to an input, and capable of suppressing vibration propagating from an engine through a frame body.

Solution to Problem

The inventors of the present teaching conducted detailed studies on suppressing vibration propagating from an engine unit through a frame body in a straddled vehicle. The inventors of the present teaching consequently discovered the following.

To enhance the rigidity of a frame body of a straddled vehicle, for example, it is conceivable to use a part of an engine unit. For instance, the engine unit is attached to a diamond-type frame body composed of a side tube and a pivot tube. In this case, an upper portion of an engine is attached to the side tube of the diamond-type frame body by using an elastic mount. In addition, a rear portion of the engine unit is fixed to the pivot tube of the diamond-type frame body by using a rigid mount.

Attaching the engine unit to the diamond-type frame body of the straddled vehicle in this manner is conceivable as a method for enhancing the rigidity of the frame body of the straddled vehicle while suppressing vibration.

In the foregoing manner of attaching the engine unit to the frame body, however, the engine unit is partially fixed, and therefore part of the vibration still propagates to the entire straddled vehicle.

The inventors of the present teaching understood that it is desired that transmission of engine vibration to the frame body is to be further suppressed in the straddled vehicle while having the engine unit disposed at the frame body in the above-described manner.

The inventors of the present teaching conducted more detailed studies on suppressing vibration propagating from the engine to the frame body in the straddled vehicle. In the course of the studies, the inventors of the present teaching examined separating a vehicle driving portion from the engine unit. More specifically, the engine unit of the straddled vehicle is series-hybridized, which allows the engine unit to be separated into an electric power generation engine for generating electric power and a drive unit including a motor for driving the straddled vehicle. The electric power generation engine is attached to a vehicle frame structure in a swingable manner, and is attached separate from the drive unit. In the drive unit, vibration like that produced in the engine does not occur. Therefore, the drive unit can be supported by the vehicle frame structure. In the electric power generation engine, vibration does occur. Thus, the electric power generation engine is attached to the vehicle frame structure in a swingable manner, so that vibration propagating through the vehicle frame structure can be suppressed. Consequently, it is possible to transmit rotational power from the drive unit to a driving wheel while preventing or reducing an influence of the engine vibration. Moreover, since the drive unit is supported by the vehicle frame structure independently of the electric power generation engine supported by the vehicle frame structure in a swingable manner, it is possible to prevent or suppress occurrence of a situation where transmission of rotational power from the drive unit to the driving wheel is influenced by the swingable support of the electric power generation engine via the vehicle frame structure. This allows rotational power to be efficiently transmitted from the drive unit to the driving wheel, so that the vehicle can obtain a high responsiveness to an input.

As described above, the electric power generation engine is supported by the vehicle frame structure in a swingable manner while the drive unit is supported by the vehicle frame structure independently of the electric power generation engine. This can provide a high responsiveness to an input, while suppressing vibration propagating through the straddled vehicle.

A straddled vehicle according to the present teaching accomplished based on the above-described findings has the following configuration.

(1) A straddled vehicle includes:
a frame body that constitutes a vehicle frame structure;
a drive unit including a drive motor that receives electric power and outputs power;
a driving wheel that receives power outputted from the drive motor; and
an electric power generation unit including an electric power generation engine and an electric power generator, the electric power generation engine being installed such that engine power outputted by the electric power generation engine is not mechanically supplied to the driving wheel, the electric power generator being fixed to the electric power generation engine and electrically connected to an electric power transfer medium having a flexibility, the electric power generator being configured to convert engine power outputted from the electric power generation engine into electric power, and supply the electric power to the drive motor via the electric power transfer medium, whereby the straddled vehicle is series-hybridized, and the electric power generation engine is supported by the vehicle frame structure to be swingable, while the drive unit is supported by the vehicle frame structure independently of the electric power generation engine.

The straddled vehicle according to (1) includes the frame body, the drive unit, the driving wheel, and the electric power generation unit. The frame body constitutes the vehicle frame structure. The drive unit includes the drive motor that receives electric power, and outputs power. The driving wheel receives power outputted from the drive motor.

The electric power generation unit includes the electric power generation engine and the electric power generator. The electric power generation engine is swingably supported by the vehicle frame structure. Engine power outputted by the electric power generation engine is not mechanically transmitted to the driving wheel. Therefore, the driving wheel receives power outputted from the drive motor. The electric power generator is connected to the electric power transfer medium having a flexibility. The electric power generator converts engine power outputted from the electric power generation engine into electric power, and supplies the electric power obtained as a result of the conversion to the drive motor via the electric power transfer medium.

In the straddled vehicle according to (1), the driving wheel receives motor power outputted from the drive motor. The driving wheel does not mechanically receive engine power outputted from the electric power generation engine. The electric power generation engine is swingably supported by the frame structure, and the electric power generator is connected to the electric power transfer medium having a flexibility. The drive unit is supported by the vehicle frame structure, independently of the electric power generation engine swingably supported by the vehicle frame structure.

Accordingly, in the straddled vehicle according to (1), a high responsiveness to an input can be obtained, while vibration propagating through the straddled vehicle can be suppressed.

In an aspect of the present teaching, the straddled vehicle can adopt the following configuration.

(2) The straddled vehicle according to (1) is configured such that the vehicle frame structure is composed of either one of a frame structure itself or a combination of the frame structure and a rear arm, and in a case of the vehicle frame structure being composed of the frame structure itself, the frame structure itself supports the driving wheel that is rotatable, in a case of the vehicle frame structure being composed of the combination of the frame structure and the rear arm, the rear arm supports the driving wheel that is rotatable and is supported by the frame structure via a support portion such that the rear arm be swingable about the support portion, and the electric power generation engine is supported in a swingable manner from two or more positions of the vehicle frame structure in a side view of the vehicle such that the electric power generation engine makes a translational reciprocating motion or a substantially translational reciprocating motion, while the drive unit is fixed to the vehicle frame structure without interposition of any elastic member independently of the electric power generation engine.

In the straddled vehicle according to (2), a high responsiveness to an input and suppression of vibration propagating through the straddled vehicle can be obtained at higher level. Here, the substantially translational reciprocating motion means a motion containing at least a translational reciprocating motion component, and may contain another motion component, such as at least one type from a translational rotating motion component or a rotating motion component, for example.

In an aspect of the present teaching, the straddled vehicle can adopt the following configuration.

(3) The straddled vehicle according to (1) is configured such that the electric power generation engine is supported from two or more positions of the vehicle frame structure in a side view of the vehicle with interposition of elastic members.

In the straddled vehicle according to (3), the electric power generation engine is supported by the frame structure with interposition of the elastic members. Accordingly, in the straddled vehicle according to (3), transmission of vibration of the electric power generation engine to the frame body can be suppressed.

In an aspect of the present teaching, the straddled vehicle can adopt the following configuration.

(4) The straddled vehicle according to (1) is configured such that the electric power generation engine is supported from three or more positions of the vehicle frame structure in a side view of the vehicle via link members.

In the straddled vehicle according to (4), the electric power generation engine is attached to the frame structure via the link members. In the straddled vehicle according to (4), transmission of vibration of the electric power generation engine in the up-down direction and the front-back direction to the frame structure can be suppressed. Accordingly, in the straddled vehicle according to (4), the presence of the link members can efficiently suppress transmission of vibration of the electric power generation engine to the frame body.

In an aspect of the present teaching, the straddled vehicle can adopt the following configuration.

(5) The straddled vehicle according to (4) is configured such that at least one of the link members is attached to either the vehicle frame structure or the electric power generation engine with interposition of an elastic member.

In the straddled vehicle according to (5), the elastic member can suppress excessive swinging of the link member. Accordingly, in the straddled vehicle according to (5), large swinging of the electric power generation engine in the up-down direction and the front-back direction can be suppressed.

In an aspect of the present teaching, the straddled vehicle can adopt the following configuration.

(6) The straddled vehicle according to any one of (2) to (5) is configured such that the electric power generation engine is provided with a balancer.

In the straddled vehicle according to (6), the electric power generation engine is provided with the balancer. Accordingly, in the straddled vehicle according to (6), vibration of the electric power generation engine can be absorbed efficiently.

In an aspect of the present teaching, the straddled vehicle can adopt the following configuration.

(7) The straddled vehicle according to any one of (1) to (6) is configured such that:
the vehicle frame structure includes
a frame structure, and
a rear arm that supports the driving wheel that is rotatable, and is supported by the frame structure via a support portion such that the rear arm be swingable about the support portion;
the straddled vehicle includes
a front wheel,
a front suspension that supports the front wheel that is rotatable, and is supported by the frame body, and
the rear arm; and
the drive unit is fixed to the rear arm, and does not constitute the frame structure.

In the straddled vehicle according to (7), an engine unit of the straddled vehicle is series-hybridized, which can be separated into the electric power generation engine for generating electric power and the drive unit including the motor for driving the straddled vehicle. The electric power generation engine is swingably attached to the frame body. The electric power generation engine suffers from vibration. The electric power generation engine, if swingably attached to at least one of the frame body or the drive unit of the straddled vehicle, can suppress vibration propagating through the frame body and the drive unit of the straddled vehicle. The drive unit, on the other hand, is fixed to the rear arm of the straddled vehicle. In the straddled vehicle according to (7), therefore, a vehicle body of the straddled vehicle can be made compact. The drive unit does not suffer from vibration unlike the engine. Accordingly, in the straddled vehicle according to (7), even though the drive unit is fixed to the rear arm, no vibration is transmitted to the frame body.

In an aspect of the present teaching, the straddled vehicle can adopt the following configuration.

(8) The straddled vehicle according to (7) is configured such that
the frame body bears a load from the front wheel via a damper provided to the front suspension, and bears a load from the driving wheel via a damper attached to the frame body and to the rear arm.

In the straddled vehicle according to (8), the frame body supports the front suspension that supports the front wheel rotatably, and supports the rear arm swingably, the rear arm supporting the driving wheel rotatably. An example of the front suspension can be a front fork. The frame body supports the front fork rotatably. Consequently, the frame structure having a high rigidity bears loads from the front wheel and the driving wheel, and at the same time can suppress propagation of vibration of the electric power generation engine to the entire straddled vehicle.

In an aspect of the present teaching, the straddled vehicle can adopt the following configuration.

(9) The straddled vehicle according to any one of (1) to (6) is configured such that
the drive unit is fixed to the frame body without interposition of any elastic member.

In the straddled vehicle according to (9), a rotational power source of the straddled vehicle is separated into the electric power generation engine for generating electric power and the drive unit including the motor for driving the straddled vehicle. The drive unit does not suffer from vibration unlike the engine. It is therefore possible that the drive unit serves as a rigid member that is fixed to the frame body of the straddled vehicle with a rigid mount. Such a configuration can still suppress vibration propagating through the frame body and the drive unit of the straddled vehicle.

Attaching the electric power generation engine and the drive unit to the frame body of the straddled vehicle as described in the straddled vehicle according to (9) can further enhance the rigidity of the straddled vehicle, and also can further suppress vibration propagating through the straddled vehicle.

In an aspect of the present teaching, the straddled vehicle can adopt the following configuration.

(10) The straddled vehicle according to (9) is configured such that:
the vehicle frame structure includes
a frame structure, and
a rear arm that supports the driving wheel that is rotatable, and is supported by the frame via a support portion such that the rear arm be swingable about the support portion;
the straddled vehicle includes
a front wheel,
a front suspension that supports the front wheel that is rotatable, and is supported by the frame body, and
the rear arm; and
the frame body and the drive unit are unified by being fixed to each other without interposition of the elastic member, to constitute the frame structure that bears a load from the front wheel via the front suspension and bears a load from the driving wheel via the rear arm.

In the straddled vehicle according to (10), the frame body and the drive unit are unified to constitute the frame structure having a high rigidity. The frame structure supports the front suspension that supports the front wheel rotatably, and supports the rear arm swingably, the rear arm supporting the driving wheel rotatably. An example of the front suspension can be a front fork. The frame body supports the front fork rotatably. Consequently, the frame structure having a high rigidity bears loads from the front wheel and the driving wheel, and at the same time can suppress propagation of vibration of the electric power generation engine to the entire straddled vehicle.

In an aspect of the present teaching, the straddled vehicle can adopt the following configuration.

(11) The straddled vehicle according to (10) is configured such that
the frame structure bears a load from the driving wheel via a damper attached to the frame structure and to the rear arm, and bears a load from the front wheel via a damper of the front suspension.

In the straddled vehicle according to (11), shock that the frame structure receives from the front wheel via the front suspension and shock that the frame structure receives from the driving wheel via the rear arm in traveling are absorbed by the dampers. This can suppress propagation of both vibration from the electric power generation engine and shocks from the front wheel and the driving wheel to the entire straddled vehicle via the frame structure having a high rigidity.

The terminology used herein is for defining particular embodiments only and is not intended to be limiting the teaching. As used herein, the term "and/or" includes any and all combinations of one or more of the associated listed items. As used herein, the terms "including", "comprising", or "having", and variations thereof specify the presence of stated features, steps, elements, components, and/or equivalents thereof, and can include one or more of steps, operations, elements, components, and/or their groups. As used herein, the terms "attached", "connected", "coupled", and/or equivalents thereof are used in a broad sense, and include both of direct and indirect attachment, connection, and coupling. The terms "connected" and "coupled" are not limited to physical or mechanical connection or coupling, and can include direct and indirect electrical connection and coupling. Unless otherwise defined, all terms (including technical and scientific terms) used herein have the same meaning as commonly understood by one of ordinary skill in the art to which the present teaching belongs. It will be further understood that terms, such as those defined in commonly used dictionaries, should be interpreted as having a meaning that is consistent with their meaning in the context of the present teaching and relevant art and should not be interpreted in an idealized or overly formal sense unless expressly so defined herein. It will be understood that the description of the present teaching discloses the number of techniques and steps. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, Description and Claims should be read with the understanding that such combinations are entirely within the scope of the present teaching and the claims.

Description herein will give an explanation about a novel straddled vehicle. In the description given below, for the purposes of explanation, numerous specific details are set forth in order to provide a thorough understanding of the present teaching. It will be apparent, however, that those skilled in the art may practice the present teaching without these specific details. The present disclosure is to be considered as an exemplification of the present teaching, and is not intended to limit the present teaching to the specific embodiments illustrated by drawings or descriptions below.

The straddled vehicle (straddled vehicle) refers to a vehicle of a type including a saddle on which a driver can sit astride. Examples of the straddled vehicle encompass a scooter type motorcycle, a moped type motorcycle, an offroad type motorcycle, and an onroad type motorcycle. The straddled vehicle is not limited to motorcycles. Alternatively, for example, the straddled vehicle may be a three-wheeled motor vehicle, an all-terrain vehicle (ATV), or the like. The three-wheeled motor vehicle may include two front wheels and one rear wheel. Alternatively, the three-wheeled motor vehicle may include one front wheel and two rear wheels. The driving wheel of the straddled vehicle may be either a rear wheel or a front wheel. Alternatively, both the rear wheel and the front wheel may serve as driving wheels of the straddled vehicle. Mechanical power is outputted from the electric power generation engine or the drive motor, and the driving wheel receives only the mechanical power outputted from the drive motor. A straddled vehicle of this type is a series hybrid type straddled vehicle.

The straddled vehicle is preferably capable of making a turn in a leaning posture. The straddled vehicle capable of making a turn in a leaning posture is configured to make a turn while leaning toward the inside of a curve. With this, the straddled vehicle capable of making a turn in a leaning posture can resist against a centrifugal force acting on the straddled vehicle during a turn. The straddled vehicle capable of making a turn in a leaning posture may be a motorcycle or a three-wheeled motor vehicle, for example. Since the straddled vehicle capable of making a turn in a leaning posture is required to have agility, the responsiveness of running to a manipulation for starting is highly valued.

The frame body constitutes a framework of the straddled vehicle, and supports mounted parts of the straddled vehicle, such as an engine, an electric power generation unit, a drive unit, a battery, and a fuel tank, for example. The frame body is composed of a head pipe and a beam portion fixed to the head pipe. The frame body may be composed of a head pipe, a beam portion, and other parts, or may be composed of parts other than a head pipe and a beam portion. The beam portion may be made of a single pipe, or may be made of a combination of two or more pipes. The beam portion may have a structure other than a pipe, such as a plate. Non-limiting examples of the frame body include a single cradle, a double cradle, a diamond-type, and a monocoque type.

The frame structure constitutes a vehicle frame structure. The vehicle frame structure is a structure that bears loads from the front wheel and the rear wheel. If the straddled vehicle includes a rear arm, the vehicle frame structure includes the frame structure and the rear arm. If the straddled vehicle does not include a rear arm, the vehicle frame structure is the frame structure itself. Thus, the vehicle frame structure is either one of the frame structure itself or a combination of the frame structure and the rear arm. The frame structure may have a part in addition to the frame body. For example, it may be possible that the frame body and the drive unit rigidly fixed to the frame body constitute the frame structure. The drive unit is not limited to this, and may not constitute the frame structure, for example, In such a configuration, the drive unit does not function as the structure that bears loads from the front wheel and the rear wheel.

The electric power generation engine is a reciprocating engine that generates power by gas combustion, and outputs the power in the form of a torque and a rotation speed of the crankshaft. The electric power generation engine encompasses, for example, a single cylinder engine and an engine having two or more cylinders. Non-limiting examples of the electric power generation engine include a rotary engine and a gas turbine engine in addition to the reciprocating engine that generates power by gas combustion, and outputs the power in the form of a torque and a rotation speed of the crankshaft.

The electric power generator is a rotating electric machine capable of generating electric power. The electric power generator may function as a starter motor. The electric power generator may be a rotating electric machine different from a starter motor. The electric power generator may be either of outer rotor type or of inner rotor type. The electric power generator may be either of radial gap type or of axial gap type. In an embodiment, the electric power generator has a rotor including a permanent magnet.

The configuration in which the electric power generator is driven by the electric power generation engine is, for example, a configuration in which the electric power generator is provided so as to be in conjunction with the crankshaft of the electric power generation engine, and a driven shaft of the electric power generator is connected to the crankshaft of the electric power generation engine via the rotational power transmission mechanism such that the driven shaft is rotated at a fixed speed ratio. A configuration in which the electric power generator is directly coupled to the crankshaft of the electric power generation engine without interposition of the rotational power transmission mechanism may be possible, too.

The drive motor is a rotating electric machine capable of motor operations. The drive motor may be a rotating electric machine capable of both electric power generation and motor operations, for example. The drive motor may be either of outer rotor type or inner rotor type. The drive motor may be either of radial gap type or axial gap type. In an embodiment, the drive motor has a rotor including a permanent magnet.

The drive unit is a part that receives electric power supplied from the electric power generator, and outputs it as rotational power. The drive unit includes the drive motor. The drive unit may include a speed reducer, a drive sprocket for a chain, or a pulley for a chain belt, in addition to the drive motor.

The electric power transfer medium having a flexibility includes at least a member that does not transmit vibration. Examples of the electric power transfer medium include an electrical cable, a cable, and the like. The electric power transfer medium having a flexibility may be a combination of a flexible member and a rigid body. The electric power transfer medium having a flexibility may be a combination of an electrical cable and a circuit board, for example.

The wording "supporting" means that a supporting part directly or indirectly bears a load of a supported part. The wording "supported" means that a supported part directly or indirectly applies a load to a supporting part. Here, the wording "directly" means that the supporting part bears a load from the supported part while being in contact with the supported part. The wording "indirectly" means that the supporting part bears a load from the supported part via another part, without being in contact with the supported part. A contact point between the supporting part and the supported part may be fixed, for example. The supporting part and the supported part may be connected swingably, for example. The supporting part and the supported part may be connected rotatably, for example. A connecting portion between the supporting part and the supported part may be where the parts are directly connected to each other. The connecting portion between the supporting part and the supported part may be where the parts are connected to each other via an elastic member, a bearing, or the like, for example.

The wording "rigidly fixed" means that a supported part is directly or indirectly fixed to a supporting part without interposition of a movable part including an elastic member, a buffer member, or the like. The supported part is, for example, fixed to the supporting part.

The rear arm is a part connecting the rear wheel to the frame structure. The rear arm supports the rear wheel rotatably. In a case of the rear wheel serving as the driving wheel, the rear arm supports the driving wheel rotatably. The rear arm is swingably supported by the frame structure.

The front suspension is a part that connects the front wheel to the frame structure. The front suspension supports the front wheel rotatably. The front fork, which is an example of the front suspension, is rotatably supported by the frame structure. The front suspension includes a damper. The damper absorbs vibration and/or shock given from the front wheel.

The elastic member is, for example, a rubber, an interior-exterior cylinder bush, or a rubber bush. The elastic member may be a damper rubber, for example. The elastic member is a member having an elasticity. Examples of the elastic member encompass a buffer member, a vibration damping member, a vibration-proof member, and the like.

The link member is a part that constitutes a link mechanism. The link member is a connector that connects at least two parts to each other. The link member rotates or swings relative to at least one of the connected parts. A connector that is fixed relative to all the parts is not covered by the definition of the link member. The link member has two or more connecting portions. At least one connecting portion out of the two or more connecting portions is formed in a bearing (bush) having a rotatable attachment shaft. The attachment shaft penetrates through the bearing provided in the link member. The link member is freely rotatable about the attachment shaft penetrating through the bearing. At least one connecting portion out of the two or more connecting portions may receive an attachment shaft via an interior-exterior cylinder bush. In this configuration, the link member swings relative to the attachment shaft penetrating through the interior-exterior cylinder bush.

The balancer is a uniaxial primary balancer that suppresses a primary inertia force of the engine, for example. The balancer is not limited to the uniaxial primary balancer, and may be a balancer that exerts another function. The balancer that exerts another function can be, for example, a primary couple balancer, a biaxial primary balancer, a uniaxial secondary balancer, a biaxial secondary balancer, or the like. As the balancer, an optimal type of balancer is selected depending on the type of the electric power generation engine and how the electric power generation engine is mounted.

Advantageous Effects of Invention

According to the present teaching, a straddled vehicle can be provided having a high responsiveness to an input and capable of suppressing vibration propagating from an engine through a frame body.

DESCRIPTION OF EMBODIMENTS

In the following, the present teaching will be described based on preferred embodiments with reference to the drawings.

First Embodiment

Figure 1:
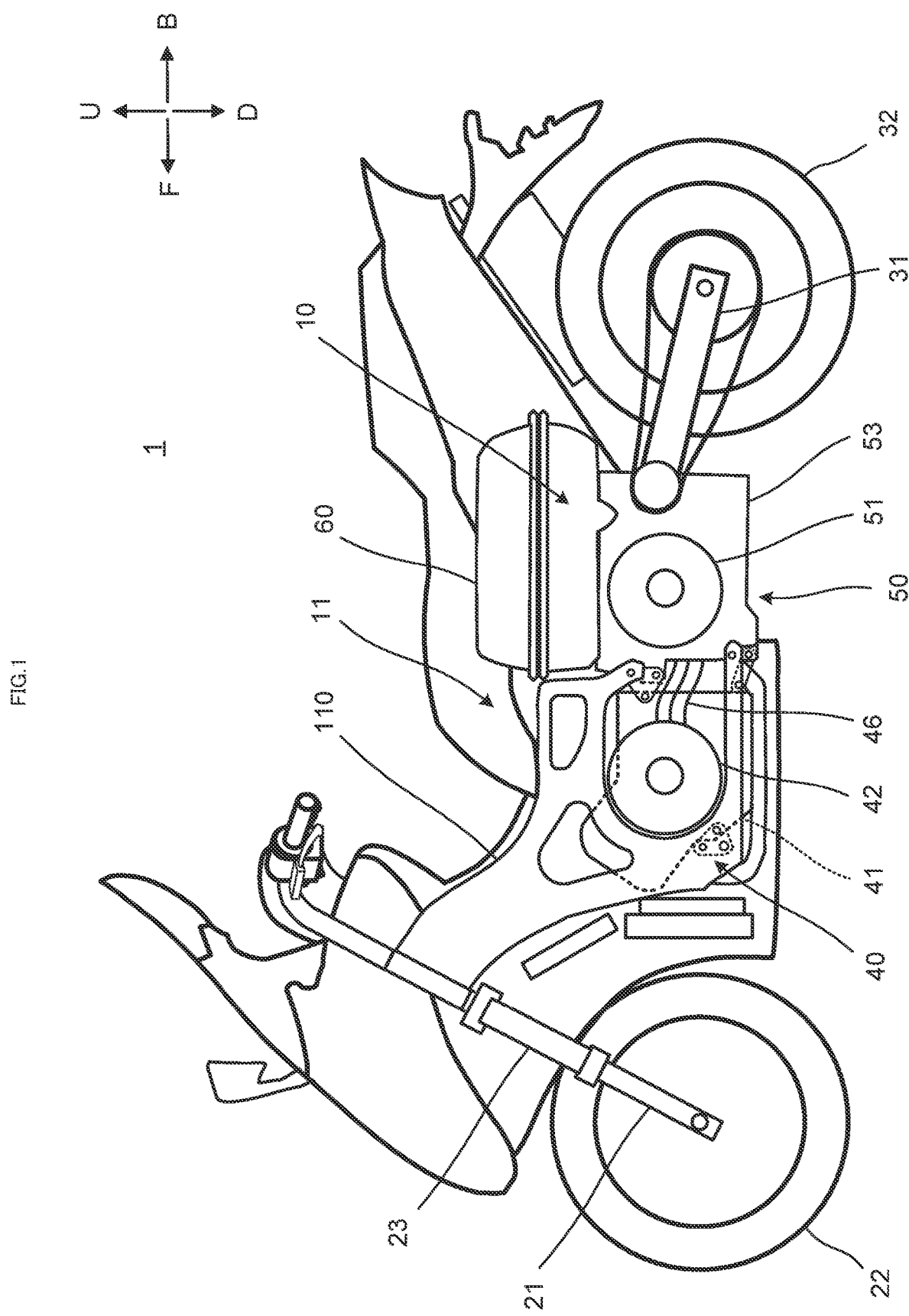
FIG. 1 A left side view of a straddled vehicle according to a first embodiment of the present teaching FIG. 2 A left side view of an electric power generation unit of the straddled vehicle shown in FIG. 1

FIG. 1 is a left side view of a straddled vehicle 1 according to a first embodiment of the present teaching. FIG. 1 shows a state where a left one of vehicle body coverings in the left-right direction of the straddled vehicle 1 is removed.

Figure 5:
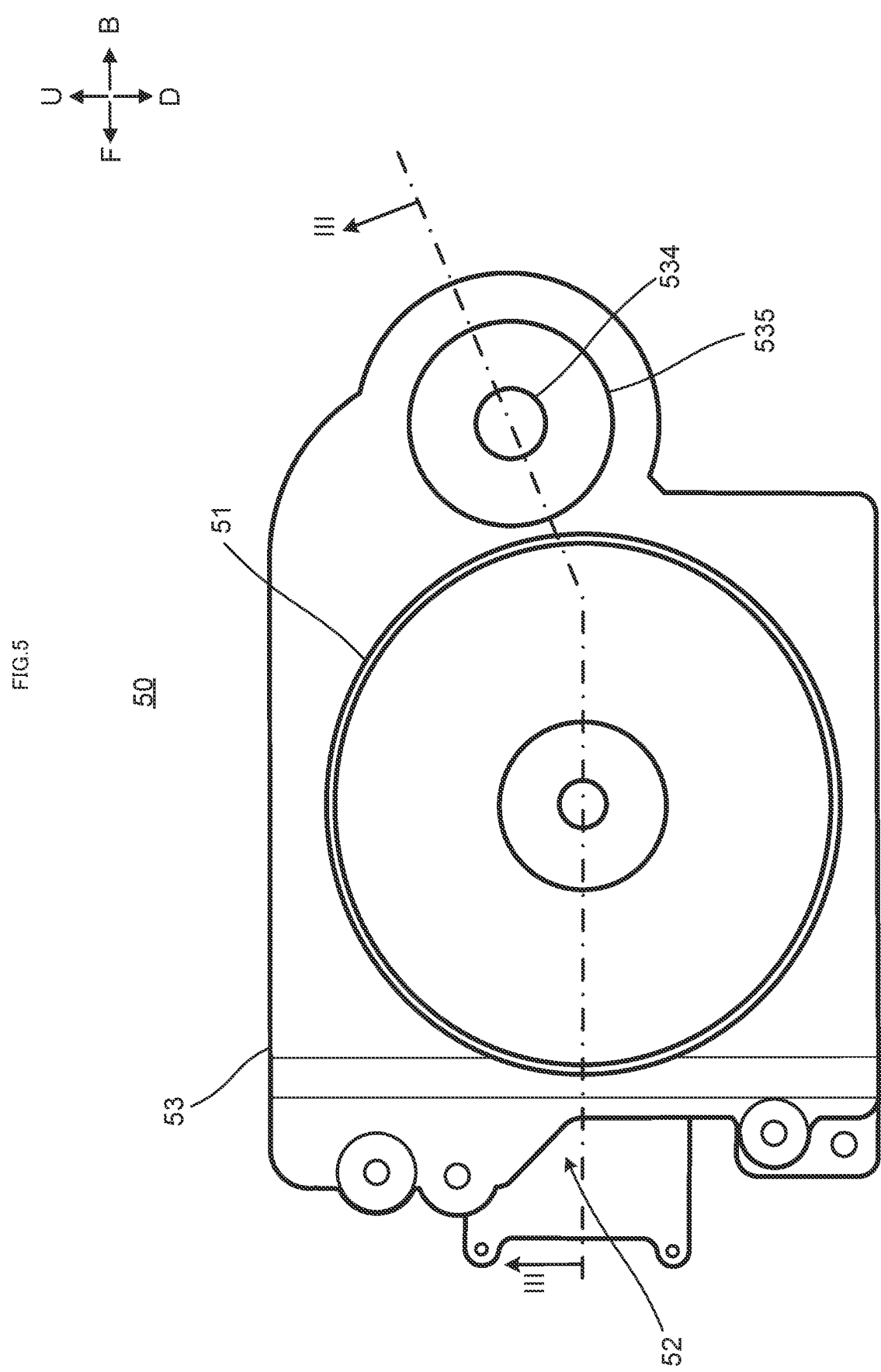
FIG. 5 A left side view of a motor unit of the straddled vehicle shown in FIG. 1

Referring to FIG. 1, overview of the straddled vehicle 1 according to this embodiment will be described. In FIG. 1, the arrow F represents the frontward direction of the straddled vehicle 1. The frontward direction is a direction in which the straddled vehicle 1 travels. The arrow B represents the backward (rearward) direction. The arrow F and the arrow B represent the front-back (front-rear) direction FB of the straddled vehicle 1. The frontward direction F, the backward direction B, and the front-back direction FB are parallel to a horizontal plane under a state where the straddled vehicle 1 is upright. The arrow U represents the upward (upper) direction. The arrow D represents the downward (lower) direction. The arrow U and the arrow D represent the up-down direction UD of the straddled vehicle 1. The upward direction U, the downward direction D, and the up-down direction UD are parallel to the vertical direction under a state where the straddled vehicle 1 is upright. FIG. 5 shows the arrow L and the arrow R, which represent the right direction and the left direction from the perspective of a rider riding on a lean vehicle. The arrow L and the arrow R represent the left-right direction LR of the straddled vehicle 1.

In Description herein, directions in relation to a device included in the straddled vehicle 1 are described by using the foregoing directions, assuming a state where the device is mounted to the straddled vehicle 1.

The straddled vehicle 1 shown in FIG. 1 is a series hybrid type straddled vehicle in which an electric power generator is driven by an electric power generation engine, and a driving wheel receives electric power generated by the electric power generator.

The straddled vehicle 1 shown in FIG. 1 includes a frame body 110. The frame body 110 constitutes a vehicle frame structure 10. The frame body 110 constitutes a framework of the straddled vehicle 1, and serves as a base for supporting mounted parts of the straddled vehicle 1.

The straddled vehicle 1 includes a drive unit 50. The drive unit 50 includes a drive motor 51. The drive motor 51 is supplied with electric power, and outputs power.

The drive unit 50 includes a gear box 53. The gear box 53 has a rigidity, and accommodates a rotational power transmission mechanism 531 (see FIG. 6) that shifts the speed of rotational power from the drive motor 51 with a predetermined gear ratio. The gear box 53 supports the drive motor 51.

As shown in FIG. 1, the drive unit 50 is supported by the vehicle frame structure 10. The vehicle frame structure 10 bears a load of the straddled vehicle 1, the load acting between a front wheel 22 and a rear wheel 32.

The straddled vehicle 1 includes an electric power generation unit 40. The electric power generation unit 40 includes an electric power generation engine 41 and an electric power generator 42. As shown in FIG. 1, the electric power generation engine 41 is swingably supported by the vehicle frame structure 10 such that the electric power generation engine 41 does not constitute the vehicle frame structure 10. The electric power generation engine 41 has a rotatable crankshaft 411 (not shown). The electric power generation engine 41 generates power by gas combustion, and outputs the power in the form of a torque and a rotation speed of the crankshaft 411. The power outputted by the electric power generation engine 41 is engine power. The power (engine power) outputted by the electric power generation engine 41 is not mechanically transmitted to the rear wheel 32.

The electric power generator 42 is provided so as to be in conjunction with the crankshaft 411. The electric power generator 42 is electrically connected to an electric power transfer medium 46 having a flexibility. The electric power transfer medium 46 is an electrical cable. The electric power generator 42 converts power received from the electric power generation engine 41 into electric power. The electric power generator 42 supplies the electric power obtained as a result of the conversion to the drive motor 51 via the electric power transfer medium 46.

The straddled vehicle 1 includes a front fork 21 and a front wheel 22. The front wheel 22 is rotatably supported by the front fork 21. The front fork 21 is rotatably supported by the frame body 110. The front fork 21 is an example of a front suspension. That is, the frame body 110 supports the front suspension. The front wheel 22 is rotatably supported by the front suspension. The vehicle frame structure 10 bears a load from the front wheel 22 via the front fork 21. The front fork 21 has a damper 23. The damper 23 attenuates vibration propagating from the front wheel 22 to the frame body 110 via the front fork 21.

The straddled vehicle 1 includes the rear wheel 32. The rear wheel 32 is driven only by power outputted from the drive motor 51. That is, power of the electric power generation engine 41 is not mechanically transmitted to the rear wheel 32. The rear wheel 32 is a driving wheel. Thus, the drive motor 51 drives the driving wheel.

The straddled vehicle 1 includes a battery 60. The battery 60 stores electric power generated by the electric power generator 42, and supplies the stored electric power to the drive motor 51.

Given the above-described configuration, the straddled vehicle 1 is series-hybridized. In addition, the straddled vehicle 1 is configured such that the electric power generation engine 41 is swingably supported by the vehicle frame structure 10, while the drive unit 50 is supported by the vehicle frame structure 10 independently of the electric power generation engine 41.

In the straddled vehicle 1, the rear wheel 32 serving as the driving wheel receives motor power outputted from the drive motor 51. The rear wheel 32 does not mechanically receive engine power outputted from the electric power generation engine 41. The electric power generation engine 41 is swingably supported by the frame structure 11, and the electric power generator 42 is connected to the electric power transfer medium 46 having a flexibility. The drive unit 50 is supported by the vehicle frame structure 10, independently of the electric power generation engine 41 swingably supported by the vehicle frame structure 10. This makes it possible that the straddled vehicle 1 has a high responsiveness to an input, with suppressed vibration propagating through the straddled vehicle 1.

[Details of Parts]

Figure 2:
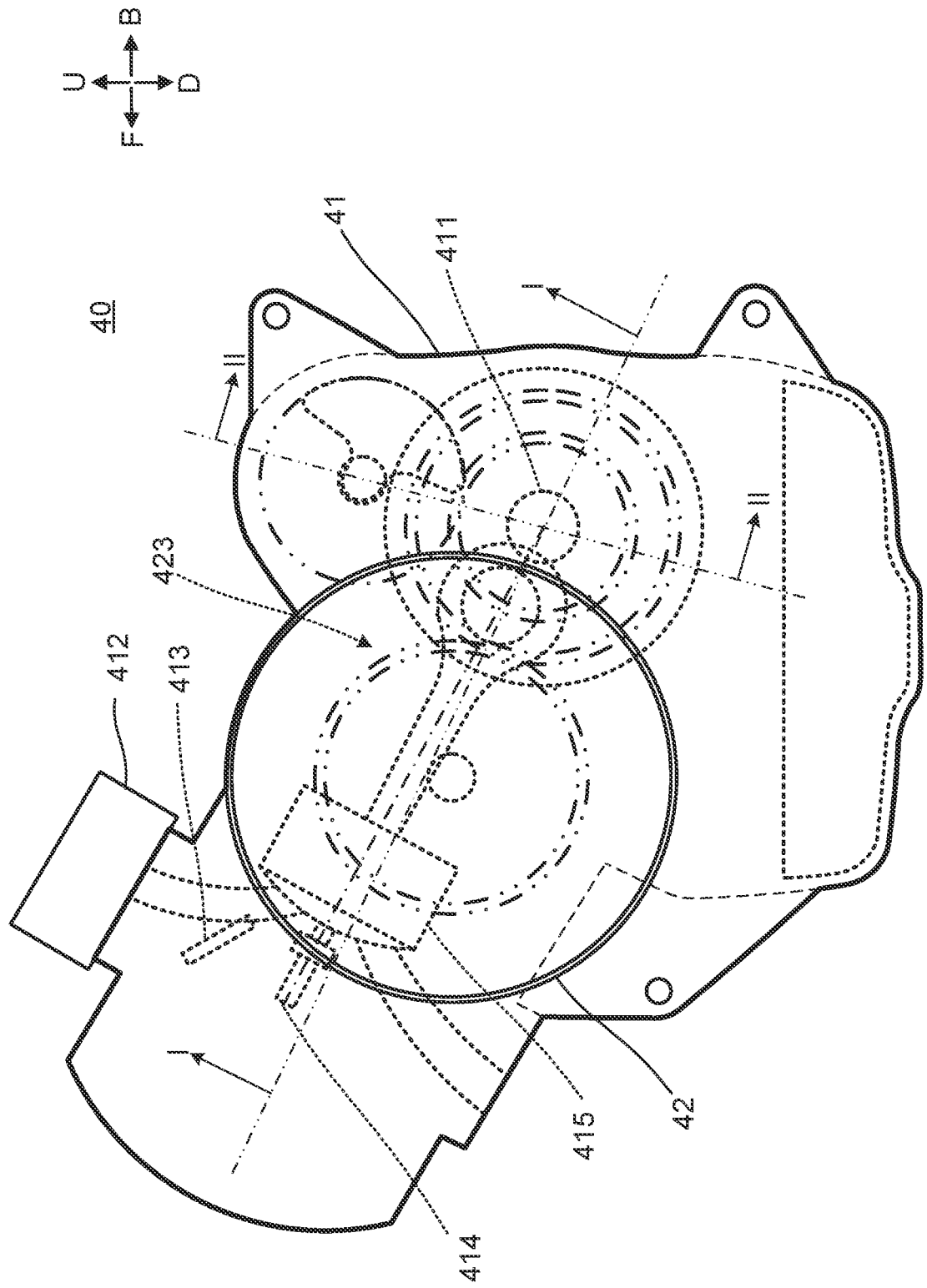
Figure 3:
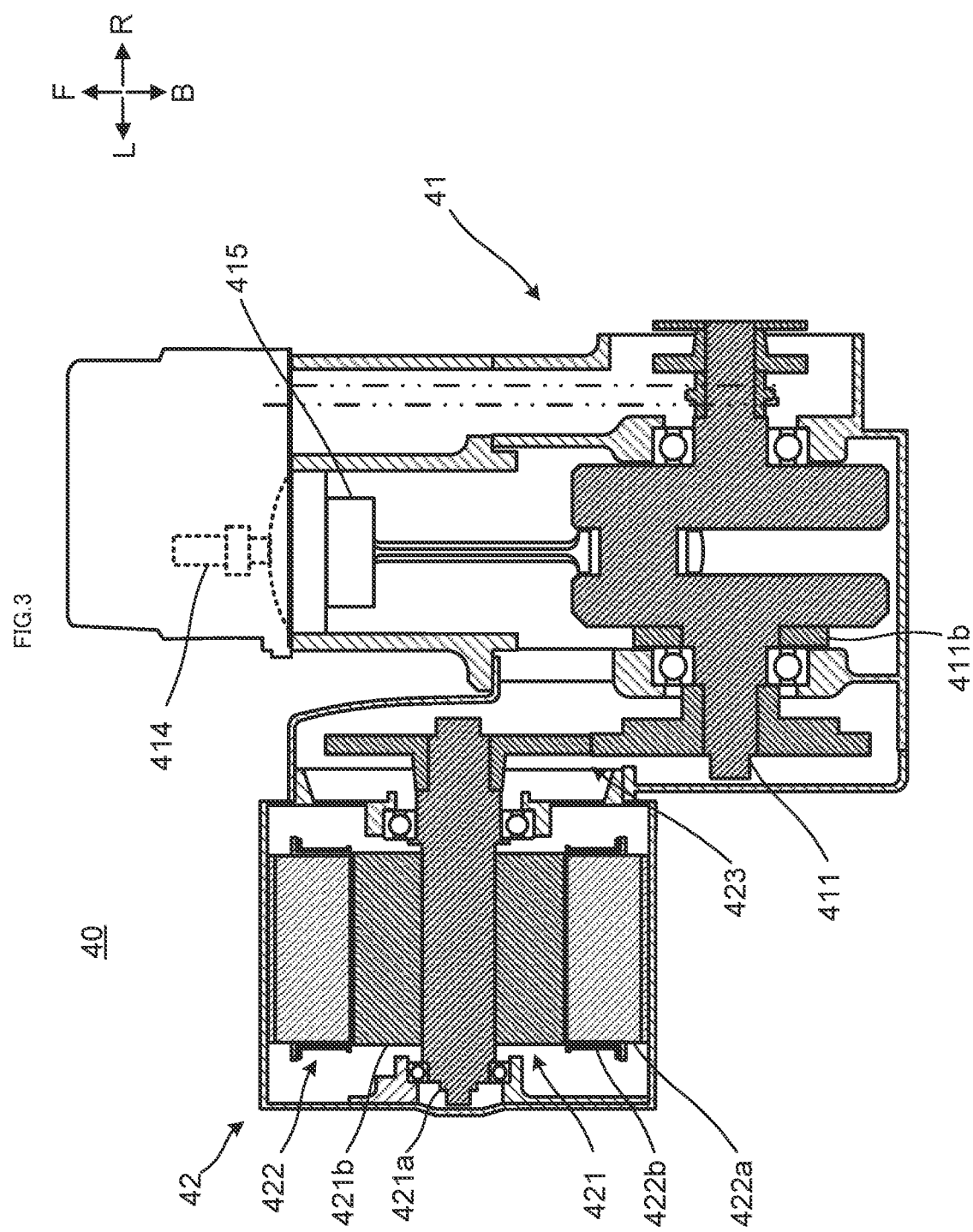
FIG. 3 A cross-sectional view as taken along the line I-I in FIG. 2
Figure 4:
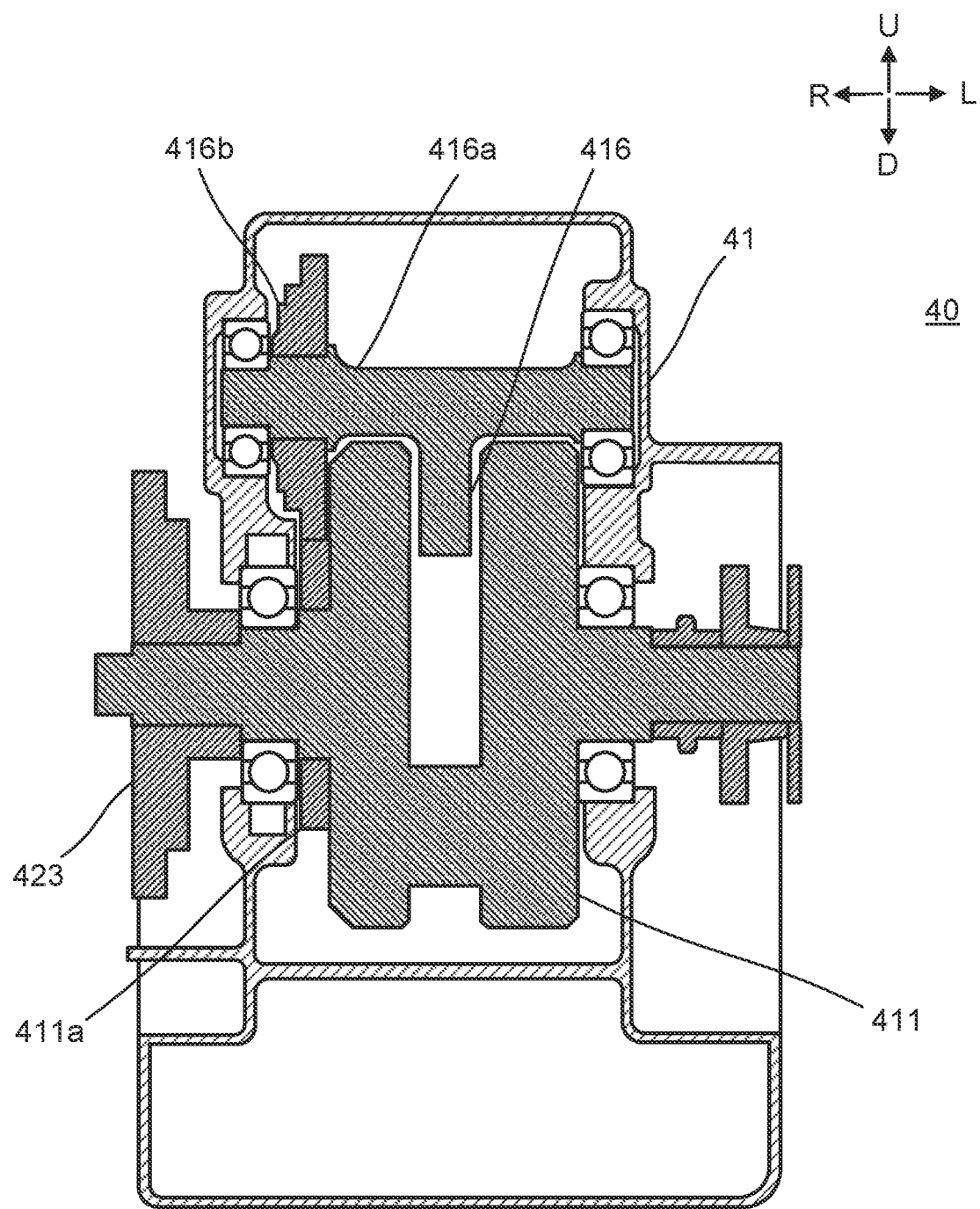
FIG. 4 A cross-sectional view as taken along the line II-II in FIG. 2

FIG. 2 is a left side view showing the electric power generation engine 41 and the electric power generator 42 of the electric power generation unit 40 included in the straddled vehicle 1 shown in FIG. 1. FIG. 3 is a cross-sectional view as taken along the line I-I in FIG. 2. FIG. 4 is a cross-sectional view as taken along the line II-II in FIG. 2.

The electric power generation engine 41 includes a throttle valve 412, a fuel injection device 413, a spark plug 414, and the crankshaft 411. The electric power generation engine 41 is an internal combustion engine. The electric power generation engine 41 performs combustion operation for burning a fuel/air mixture gas, to cause a piston 415 to move up and down, thus applying rotational power to the crankshaft 411. In this manner, the electric power generation engine 41 outputs rotational power. The throttle valve 412 and the fuel injection device 413 adjust rotational power to be outputted from the electric power generation engine 41, by regulating the amounts of the air and fuel supplied. Rotational power outputted from the electric power generation engine 41 is converted into electric power by the electric power generator 42. The electric power obtained by conversion in the electric power generator 42 is supplied to the drive motor 51, and is outputted as rotational power again.

The electric power generation engine 41 has a balancer 416. In this embodiment, the balancer 416 is a uniaxial primary balancer. A drive gear 411a attached to the crankshaft 411 drives the balancer 416 via a driven gear 416b attached to the balancer shaft 416a. Due to the balancer 416, a primary inertia force of the electric power generation engine 41 can be suppressed.

The electric power generator 42 is a permanent magnet type three-phase brushless type electric power generator. The electric power generator 42 includes a rotor 421 and a stator 422. The electric power generator 42 of this embodiment is of radial gap type. The rotor 421 is an inner rotor. The stator 422 is an outer stator. Thus, the electric power generator 42 is of inner rotor type.

The rotor 421 includes a driven shaft 421a and two or more permanent magnet parts 421b. The two or more permanent magnet parts 421b are disposed on an outer peripheral surface of the driven shaft 421a. The two or more permanent magnet parts 421b are disposed with N-pole and S-pole alternately arranged in the circumferential direction of the electric power generator 42. The two or more permanent magnet parts 421b are disposed closer to the center of the electric power generator 42 than the stator 422 with respect to the radial direction of the electric power generator 42.

The stator 422 has a stator core 422a and multiphase stator windings 422b. The stator core 422a has a yoke having a cylindrical shape and a plurality of teeth arranged at intervals in the circumferential direction of the yoke, the teeth being provided so as to extend inward. Each of the stator windings 422b is wound on each of the teeth. Each of the stator windings 422b belongs to any of U-phase, V-phase, or W-phase. The stator windings 422b are arranged in the order of U-phase, V-phase, and W-phase, for example.

In this embodiment, the electric power generator 42 is interlockingly connected to the crankshaft 411 of the electric power generation engine 41 via a rotational power transmission mechanism 423. More specifically, the rotor 421 is connected to the crankshaft 411 such that the rotor 421 rotates at a fixed speed ratio relative to the crankshaft 411. When the electric power generation engine 41 performs the combustion operation, the electric power generator 42 is driven by the electric power generation engine 41 to generate electric power.

Figure 6:
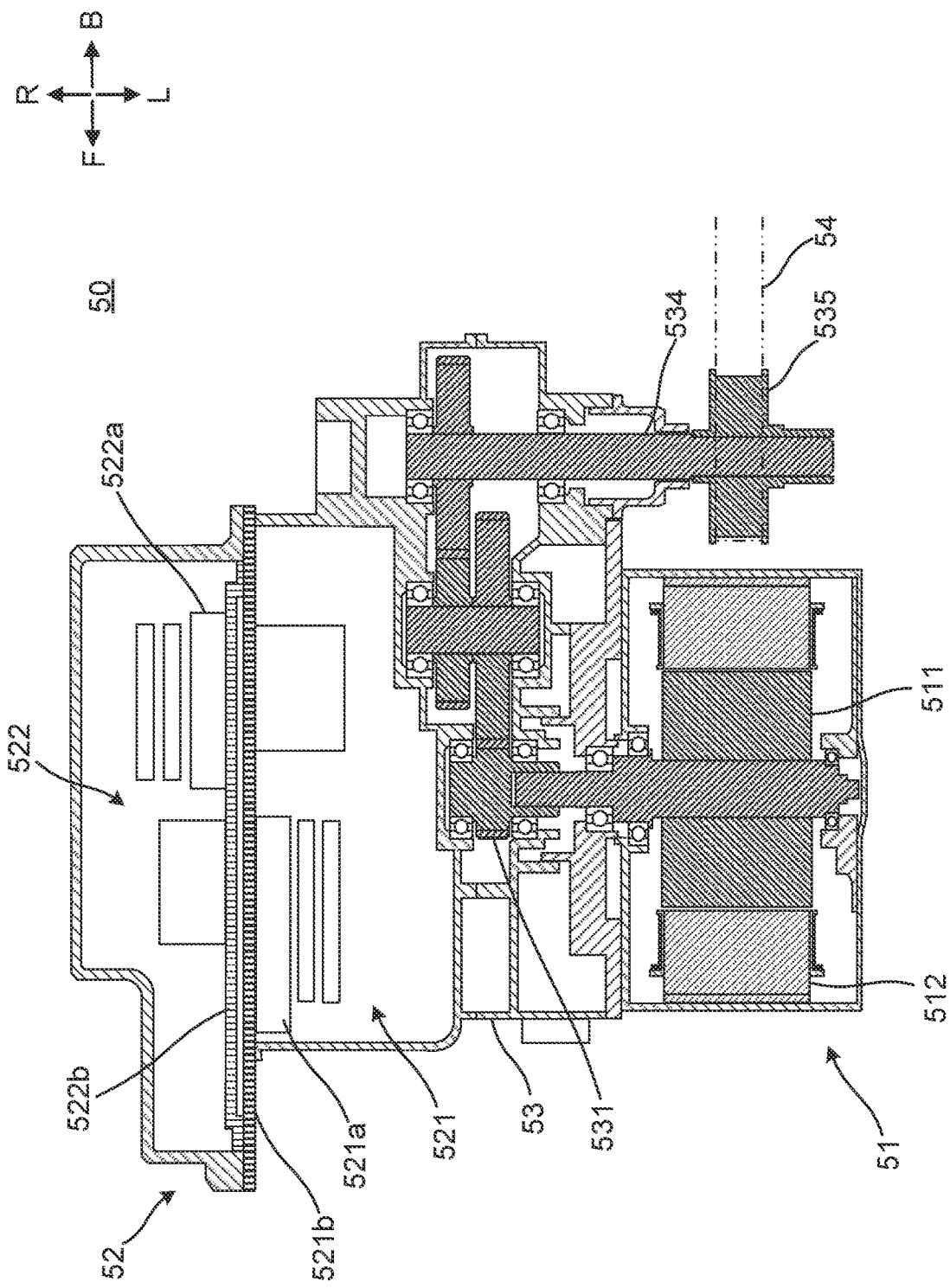
FIG. 6 A cross-sectional view as taken along the line III-III in FIG. 5

FIG. 5 is a left side view showing the drive unit 50 of the straddled vehicle 1 shown in FIG. 1. FIG. 6 is a cross-sectional view as taken along the line III-III in FIG. 5. The drive unit 50 includes the drive motor 51, a control unit 52, and the gear box 53.

The drive motor 51 is a permanent magnet type three-phase brushless type motor. The drive motor 51 functions also as a permanent magnet type three-phase brushless type electric power generator. The drive motor 51 is of radial gap type, having an inner rotor 511 and an outer stator 512.

The drive motor 51 serves as a vehicle driving motor to drive the rear wheel 32 (see FIG. 1). At this time, the drive motor 51 is supplied with electric power from at least one of the electric power generator 42 (see FIG. 2) of the electric power generation unit 40 or the battery 60 (see FIG. 1). The drive motor 51 uses the supplied electric power to output rotational power, and drives the rear wheel 32 via the rotational power transmission mechanism 531 in the gear box 53. The power outputted by the drive motor 51 is motor power.

The control unit 52 includes a drive control unit 521 and a power source control unit 522. The drive control unit 521 includes an inverter module 521a and an attachment board 521b, the inverter module 521a including an inverter and a motor controller. The power source control unit 522 includes a converter module 522a and an attachment board 522b, the converter module 522a including a converter and an electric power generation controller.

Connected to the inverter module 521a of the drive control unit 521 are the drive motor 51 of the drive unit 50, the battery 60, and the converter module 522a of the power source control unit 522. The motor controller of the inverter module 521a controls the inverter in accordance with the amount of manipulation on an accelerator grip, to convert a voltage and a current outputted by the battery 60 and/or by the electric power generator 42 into a three-phase AC, and to control a voltage and a current flowing to the drive motor 51.

Connected to the converter module 522a of the power source control unit 522 are the electric power generator 42 of the electric power generation unit 40 and the battery 60. The electric power generation controller of the converter module 522a controls the converter, to rectify a three-phase AC outputted from the electric power generator 42, and to control a voltage outputted from the electric power generator 42.

The gear box 53 accommodates the rotational power transmission mechanism 531 and an output shaft 534. A drive pulley 535 is attached to the output shaft 534. The rotational power transmission mechanism 531 constitutes a speed reducer. The rotational power transmission mechanism 531 reduces the speed of power outputted from the drive motor 51 with a predetermined gear ratio, and transmits the resulting power to the rear wheel 32. In detail, rotational power from the drive motor 51 is subjected to speed reduction by the rotational power transmission mechanism 531, and then is received by the output shaft 534. The rotational power received by the output shaft 534 goes through the drive pulley 535 and a belt chain 54, and then is received by a drive shaft of the rear wheel 32 serving as the driving wheel.

Figure 7:
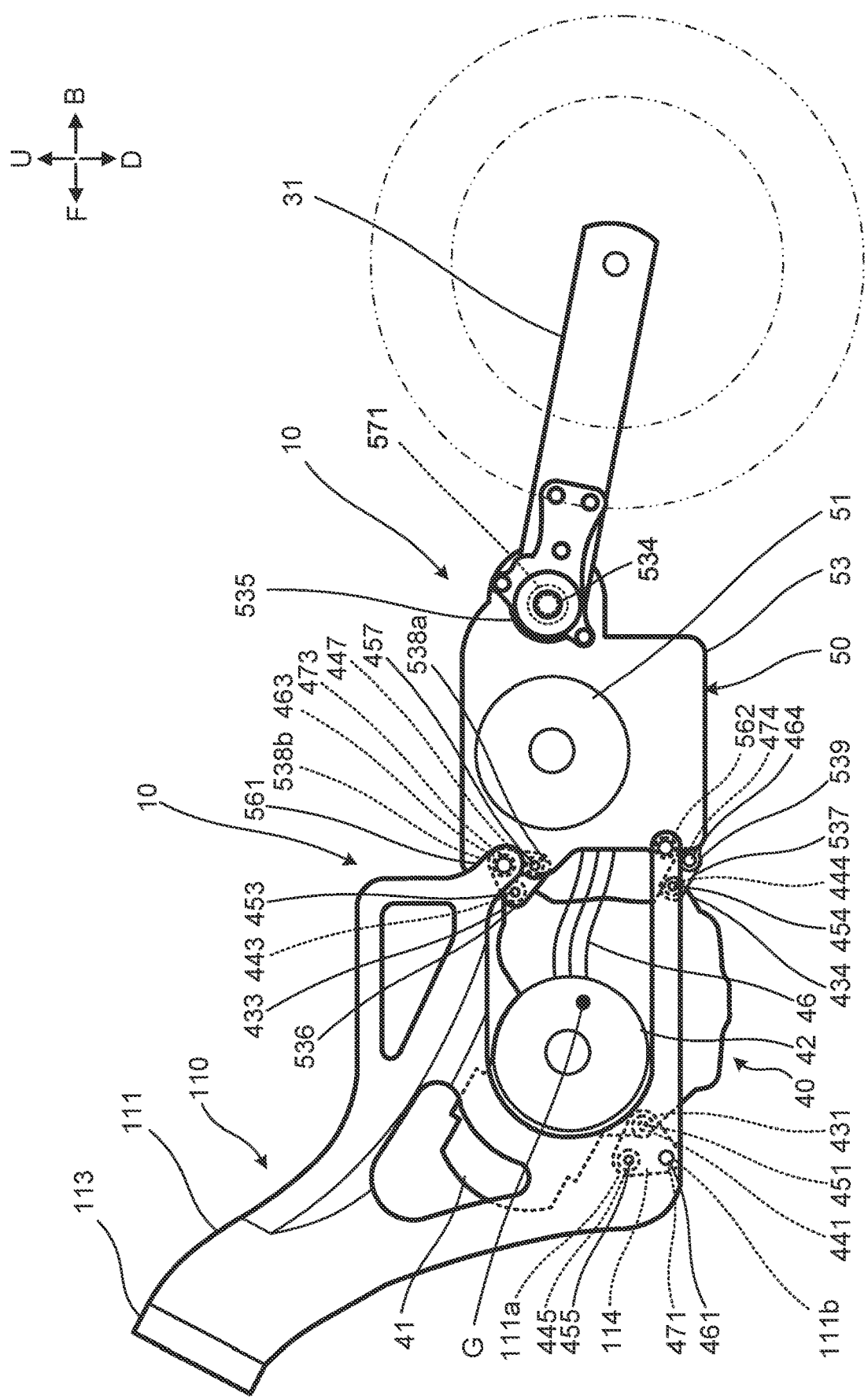
FIG. 7 A left side view showing a vehicle frame structure and an electric power generation unit of the straddled vehicle shown in FIG. 1
Figure 8:
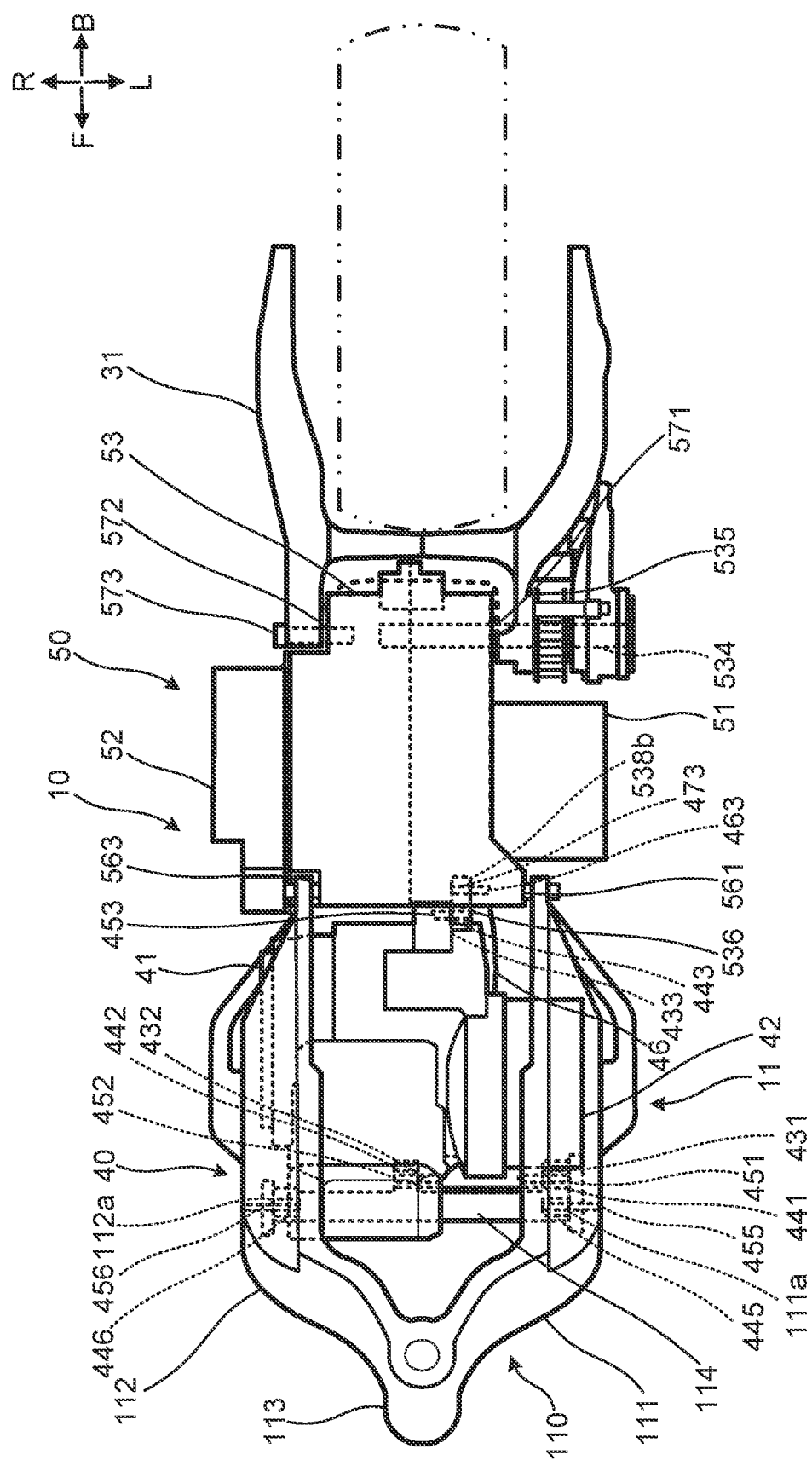
FIG. 8 A top plan view showing the vehicle frame structure and the electric power generation unit of the straddled vehicle shown in FIG. 1
Figure 9:
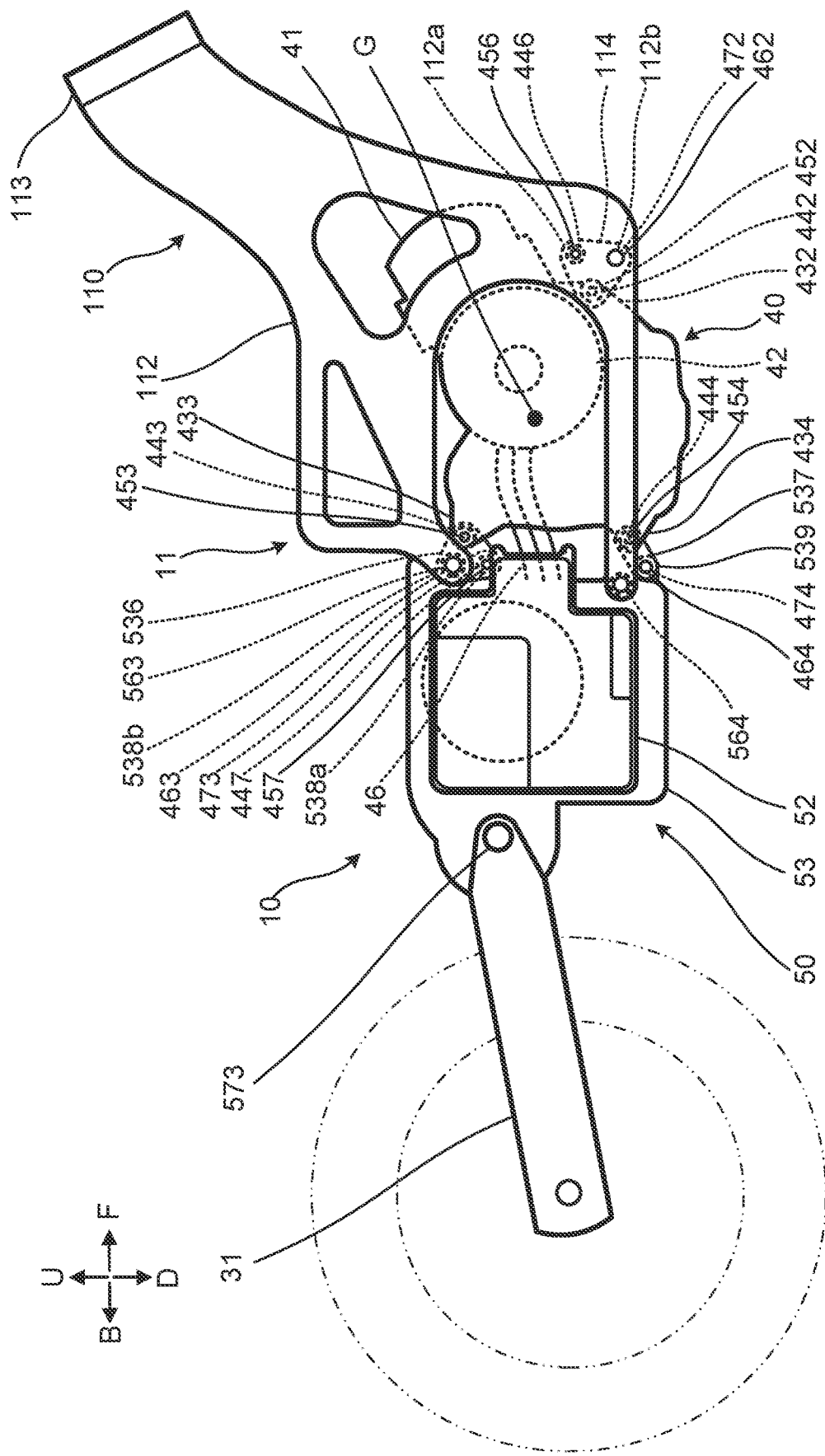
FIG. 9 A right side view showing the vehicle frame structure and the electric power generation unit of the straddled vehicle shown in FIG. 1

FIG. 7 is a left side view showing the vehicle frame structure 10 and the electric power generation unit 40 of the straddled vehicle 1 shown in FIG. 1. FIG. 8 is a top plan view showing the vehicle frame structure 10 and the electric power generation unit 40 of the straddled vehicle 1 shown in FIG. 1. FIG. 9 is a right side view showing the vehicle frame structure 10 and the electric power generation unit 40 of the straddled vehicle 1 shown in FIG. 1. Referring to FIG. 7 to FIG. 9, the relationship of supporting the vehicle frame structure 10 and the relationship of supporting the electric power generation unit 40 will be described.

In this embodiment, the drive unit 50 is rigidly fixed to the frame body 110 without interposition of any elastic member. As a result, the drive unit 50 and the frame body 110 are unified to constitute the frame structure 11. In other words, the drive unit 50 constitutes the frame structure 11 by being rigidly fixed to the frame body 110 without interposition of any elastic member. In this embodiment, the vehicle frame structure 10 is constituted by the frame structure 11. Thus, the vehicle frame structure 10 is constituted by the frame body 110 and the drive unit 50. The frame structure 11 bears a load of the straddled vehicle 1, the load acting between the front wheel 22 and the rear wheel 32. The frame structure 11 does not have a movable part that bears a load of the straddled vehicle 1.

The straddled vehicle 1 includes a rear arm 31. The rear arm 31 is swingably supported by the frame body 110 or the drive unit 50, that is, by the frame structure 11. The rear arm 31 supports the rear wheel 32, which is the driving wheel, rotatably. The frame structure 11 and the rear arm 31 are connected by a damper (not shown). The damper absorbs vibration propagating from the rear arm 31 to the frame structure 11. The vibration propagating from the rear wheel 32 to the frame structure 11 via the rear arm 31 is reduced accordingly.

The frame body 110 includes a first beam portion 111, a second beam portion 112, and a head pipe 113. The first beam portion 111 is positioned more leftward (L) than the center of the straddled vehicle 1 with respect to the left-right direction LR of the straddled vehicle 1. The second beam portion 112 is positioned more rightward (R) than the center of the straddled vehicle 1 with respect to the left-right direction LR of the straddled vehicle 1. The first beam portion 111 and the second beam portion 112 are coupled to the head pipe 113, in the front direction F with respect to the front-back direction FB of the straddled vehicle 1.

The electric power generation unit 40 is disposed between the first beam portion 111 and the second beam portion 112 of the frame body 110. In other words, the first beam portion 111 is positioned more leftward L than the electric power generation unit 40 and the second beam portion 112 is positioned more rightward R than the electric power generation unit 40 with respect to the left-right direction LR of the straddled vehicle 1.

The electric power generation engine 41 of the electric power generation unit 40 is attached at three or more points (in this embodiment, four points) to the frame body 110 and the gear box 53 included in the vehicle frame structure 10, the attachment being made via link members 114, 536, and 537.

The link member 114 is disposed between a surface of the first beam portion 111 facing toward the right direction R and a surface of the second beam portion 112 facing toward the left direction L with respect to the left-right direction LR of the straddled vehicle 1. The link member 114 as illustrated in this embodiment is a member extending in the left-right direction LR, from a position of the first beam portion 111 disposed relatively left to a position of the second beam portion 112 disposed relatively right with respect to the left-right direction LR of the straddled vehicle 1.

The link member 114 is swingably attached to an attachment shaft 451 with interposition of an elastic member 441, the attachment shaft 451 being provided in an attachment portion 431 of the electric power generation engine 41 of the electric power generation unit 40. The attachment shaft 451 is fixed to the attachment portion 431 of the electric power generation engine 41. The link member 114 is swingably attached to an attachment shaft 455 with interposition of an elastic member 445, the attachment shaft 455 being provided in an attachment portion 111a of the first beam portion 111. The attachment shaft 455 is fixed to the attachment portion 111a of the first beam portion 111. The link member 114 is attached to an attachment shaft 461 provided in an attachment portion 111b of the first beam portion 111. The attachment shaft 461 is supported by a bearing 471 provided in the link member 114. The bearing 471 is disposed such that the link member 114 rotates about a straight line extending in the left-right direction LR of the straddled vehicle 1 from the center of rotation of the bearing 471. The attachment shaft 461 is fixed to the attachment portion 111b of the first beam portion 111.

The link member 114 is swingably attached to an attachment shaft 452 with interposition of an elastic member 442, the attachment shaft 452 being provided in an attachment portion 432 of the electric power generation engine 41 of the electric power generation unit 40. The attachment shaft 452 is fixed to the attachment portion 432 of the electric power generation engine 41. The link member 114 is swingably attached to an attachment shaft 456 with interposition of an elastic member 446, the attachment shaft 456 being provided in an attachment portion 112a of the second beam portion 112. The attachment shaft 456 is fixed to the attachment portion 112a of the second beam portion 112. The link member 114 is attached to an attachment shaft 462 provided in an attachment portion 112b of the second beam portion 112. The attachment shaft 462 is supported by a bearing 472 provided in the link member 114. The bearing 472 is disposed such that the link member 114 rotates about a straight line extending in the left-right direction LR of the straddled vehicle 1 from the center of rotation of the bearing 472. The attachment shaft 462 is fixed to the attachment portion 112b of the second beam portion 112.

The attachment shafts 451, 452, 455, 456, 461, and 462 are pins, for example. The attachment shafts 451, 452, 455, 456, 461, and 462 may be bolts, for example. The axes of the attachment shafts 451, 452, 455, 456, 461, and 462 extend in the left-right direction LR of the straddled vehicle 1. The elastic members 441, 442, 445, and 446 are interior-exterior cylinder bushes, for example.

The attachment portions 431 and 432 of the electric power generation engine 41 are disposed in a region corresponding to a front portion of the electric power generation engine 41 with respect to the front-back direction FB of the straddled vehicle 1. The attachment portion 431 is positioned more leftward (L) than the electric power generation engine 41 with respect to the left-right direction LR of the straddled vehicle 1. The attachment portion 432 is positioned more rightward (R) than the electric power generation engine 41 with respect to the left-right direction LR of the straddled vehicle 1. The attachment portions 111a and 111b of the first beam portion 111 are disposed on the surface of the first beam portion 111 facing toward the right direction R with respect to the left-right direction LR of the straddled vehicle 1. The attachment portions 112a and 112b of the second beam portion 112 are disposed on the surface of the second beam portion 112 facing toward the left direction L with respect to the left-right direction LR of the straddled vehicle 1.

The link member 536 is swingably attached to an attachment shaft 453 with interposition of an elastic member 443, the attachment shaft 453 being provided in an attachment portion 433 of the electric power generation engine 41 of the electric power generation unit 40. The attachment shaft 453 is fixed to the attachment portion 433 of the electric power generation engine 41. The link member 536 is swingably attached to an attachment shaft 457 with interposition of an elastic member 447, the attachment shaft 457 being provided in an attachment portion 538a of the gear box 53. The attachment shaft 457 is fixed to the attachment portion 538a of the gear box 53. The link member 536 is attached to an attachment shaft 463 provided in an attachment portion 538b of the gear box 53. The attachment shaft 463 is supported by a bearing 473 provided in the link member 536. The bearing 473 is disposed such that the link member 536 rotates about a straight line extending in the left-right direction LR of the straddled vehicle 1 from the center of rotation of the bearing 473. The attachment shaft 463 is fixed to the attachment portion 538b of the gear box 53.

The link member 537 is swingably attached to an attachment shaft 454 with interposition of an elastic member 444, the attachment shaft 454 being provided in an attachment portion 434 of the electric power generation engine 41 of the electric power generation unit 40. The attachment shaft 454 is fixed to the attachment portion 434 of the electric power generation engine 41. The link member 537 is attached to an attachment shaft 464 provided in an attachment portion 539 of the gear box 53. The attachment shaft 464 is supported by a bearing 474 provided in the link member 537. The bearing 474 is disposed such that the link member 537 rotates about a straight line extending in the left-right direction LR of the straddled vehicle 1 from the center of rotation of the bearing 474. The attachment shaft 464 is fixed to the attachment portion 539 of the gear box 53.

The attachment shafts 453, 454, 457, 463, 464 are pins, for example. The attachment shafts 453, 454, 457, 463, 464 may be bolts, for example. The axes of the attachment shafts 453, 454, 457, 463, 464 extend in the left-right direction LR of the straddled vehicle 1. The elastic members 443, 444, and 447 are interior-exterior cylinder bushes, for example.

The attachment portions 431 and 432 of the electric power generation engine 41 are disposed in a region corresponding to a lower portion and the front portion of the electric power generation engine 41 with respect to the up-down direction UD and the front-back direction FB of the straddled vehicle 1. The attachment portion 433 of the electric power generation engine 41 is disposed in a region corresponding to an upper portion and a rear portion of the electric power generation engine 41 with respect to the up-down direction UD and the front-back direction FB of the straddled vehicle 1. The attachment portion 434 of the electric power generation engine 41 is disposed in a region corresponding to the lower portion and the rear portion of the electric power generation engine 41 with respect to the up-down direction UD and the front-back direction FB of the straddled vehicle 1. The attachment portions 538a, 538b, and 539 of the gear box 53 are disposed in a region corresponding to a front portion of the gear box 53.

The link member 114 rotates about a straight line extending in the left-right direction LR of the straddled vehicle 1 from the attachment shaft 461 supported by the bearing 471 and the attachment shaft 462 supported by the bearing 472. The link member 536 rotates about a straight line extending in the left-right direction LR of the straddled vehicle 1 from the attachment shaft 463 supported by the bearing 473. The link member 537 rotates about a straight line extending in the left-right direction LR of the straddled vehicle 1 from the attachment shaft 464 supported by the bearing 474. The link member 114 is attached to the electric power generation engine 41 with interposition of the elastic members 441 and 442. The link members 536 and 537 are attached to the electric power generation engine 41 with interposition of the elastic members 443 and 444, respectively. Accordingly, the electric power generation engine 41 rotates about a straight line extending in the left-right direction LR of the straddled vehicle 1 from the center-of-gravity G. Consequently, the electric power generation engine 41 of the straddled vehicle 1 can suppress transmission of vibration in the up-down direction UD and the front-back direction FB of the straddled vehicle 1 to the frame structure 10. The electric power generation engine 41 also suppresses a primary inertia force of the electric power generation engine 41 by means of the balancer 416. With the link members 114, 536, and 537 in combination with the balancer 416, the straddled vehicle 1 of this embodiment can efficiently suppress transmission of vibration of the electric power generation engine 41 to the vehicle frame structure 10.

The link member 114 is attached to the frame body 110 with interposition of the elastic members 445 and 446. The link member 536 is attached to the gear box 53 with interposition of the elastic member 447. Accordingly, in the electric power generation engine 41 of the straddled vehicle 1, the elastic members 445 to 447 work as stoppers that suppress excessive swinging, so that large swinging in the up-down direction UD and the front-back direction FB of the straddled vehicle 1 can be suppressed.

The gear box 53 is rigidly fixed at four points to a rear end portion of the frame body 110 in the front-back direction FB of the straddled vehicle 1 including the frontward direction and the backward direction. To be specific, the frame body 110 is in contact with and fixed to the gear box 53 at four points without interposition of an elastic member such as a rubberbush, the four points being attachment portions 561 to 564 of the gear box 53 shown in FIG. 7 to FIG. 9. The attachment portion 561 is disposed in an upper left portion of the gear box 53, and the attachment portion 562 is disposed in a lower left portion of the gear box 53. The attachment portion 563 is disposed in an upper right portion of the gear box 53, and the attachment portion 564 is disposed in a lower right portion of the gear box 53. Supporting is implemented by, for example, fixing the frame body 110 with bolts at the attachment portions 561 to 564 of the gear box 53.

Since the gear box 53 is rigidly fixed to the frame body 110, the gear box 53 and the frame body 110 are unified to constitute the frame structure 11. Thus, the gear box 53 cooperates with the frame body 110 to form a framework of the straddled vehicle 1, and can bear loads from the front wheel 22, the rear wheel 32, and the electric power generation unit 40.

In the straddled vehicle 1, the gear box 53 of the drive unit 50 constitutes the frame structure 11 by being rigidly fixed to the frame body 110 without interposition of any elastic member. Accordingly, in the straddled vehicle 1, the gear box 53 can be used as a rigid member of the frame structure 11, so that the rigidity of the straddled vehicle can be enhanced.

In the straddled vehicle 1, the rear wheel 32 serving as the driving wheel receives only power outputted from the drive motor 51, without receiving power outputted from the electric power generation engine 41. The electric power generation engine 41 is swingably supported by the frame body 110, and the electric power generator 42 of the electric power generation unit is connected to the drive motor 51 by an electric power transfer medium that has a flexibility and that does not transmit vibration. With this, the straddled vehicle 1 can enhance the rigidity of the frame structure 11, and at the same time can suppress propagation of vibration from the electric power generation engine 41 to the entire straddled vehicle via the frame structure 11 including the frame body 110 and the drive unit 50.

Referring to FIG. 7 to FIG. 9, the rear arm 31 is swingably supported by the gear box 53 at two points, namely, attachment portions 571 and 572 disposed in the gear box 53. The attachment portion 571 is disposed in a left portion of the gear box 53, and the attachment portion 572 is disposed in a right portion of the gear box 53. In detail, the output shaft 534 of the rotational power transmission mechanism 531 penetrates through the attachment portion 571 and the rear arm 31. An attachment bolt 573 (see FIG. 8), which penetrates through the rear arm 31, is received in an attachment hole provided in the attachment portion 572 of the gear box.

Second Embodiment

Figure 10:
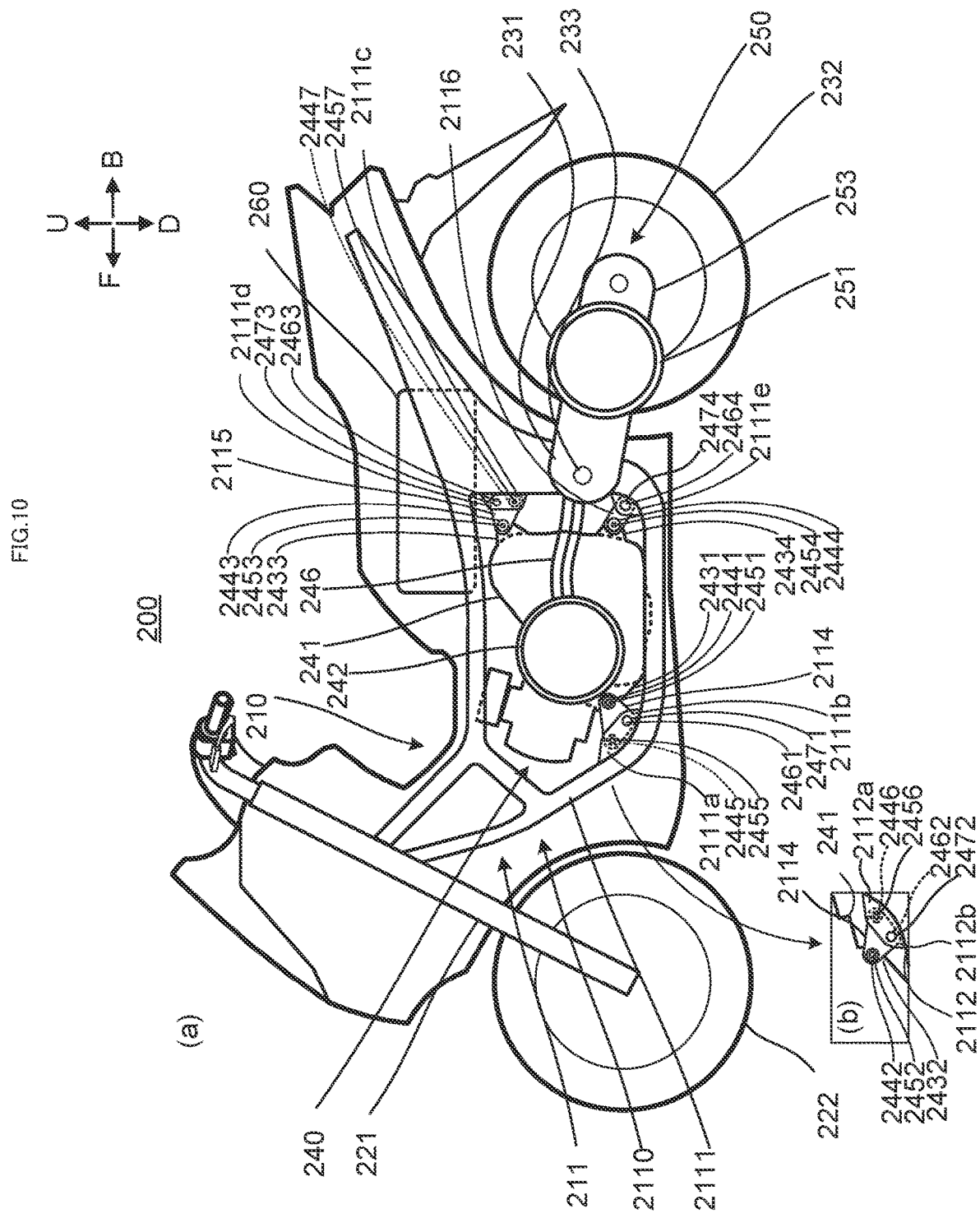
FIG. 10 A diagram showing an external appearance of a straddled vehicle according to a second embodiment of the present teaching

FIG. 10 is a diagram showing an external appearance of a straddled vehicle 200 according to a second embodiment of the present teaching. FIG. 10(a) is a left side view of the straddled vehicle 200, and FIG. 10(b) is a right side view of the straddled vehicle 200, showing a part of an engine mount on an enlarged scale. FIG. 10 shows a state where a left one of vehicle body coverings of the straddled vehicle 200 is removed. This embodiment is different from the straddled vehicle 1 according to the first embodiment, in terms of a configuration of a drive unit 250 and how an electric power generation unit 240 and the drive unit 250 are supported in relation to a frame body 2110. Differences of this embodiment from the first embodiment will only be described below.

In this embodiment, a vehicle frame structure 210 is constituted by a frame structure 211 and a rear arm 231. The frame structure 211 consists of the frame body 2110 alone. The rear arm 231 is swingably supported by the frame body 2110. The rear arm 231 supports a rear wheel 232 rotatably, and is supported by the frame structure 211 with interposition of a support portion 233 such that the rear arm 231 can swing about the support portion 233. A gear box 253 is attached to the rear arm 231. The gear box 253 may constitute the rear arm 231. A drive motor 251 is attached to the gear box 253, that is, to the rear arm 231. Electric power that is obtained as a result of conversion from engine power is supplied from an electric power generator 242 of the electric power generation unit 240 electrically connected to an electric power transfer medium 246 to the drive motor 251 via the electric power transfer medium 246. In this embodiment, the drive unit 250 is not fixed to the frame body 2110. Thus in this embodiment, the drive unit 250 does not constitute the frame structure 211.

An electric power generation engine 241 of the electric power generation unit 240 is attached at three or more points (in this embodiment, via a four-point link member) to the frame body 2110, which is the frame structure 211.

A link member 2114 is disposed between a first beam portion 2111 and a second beam portion 2112 with respect to the left-right direction LR of the straddled vehicle 200. The link member 2114 as illustrated in this embodiment is a member extending in the left-right direction LR, from a position of a first beam portion 2111 disposed relatively left to a position of a second beam portion 2112 disposed relatively right with respect to the left-right direction LR of the straddled vehicle 200.

As shown in FIG. 10(a), the link member 2114 is swingably attached to an attachment shaft 2451 with interposition of an elastic member 2441, the attachment shaft 2451 being provided in an attachment portion 2431 of the electric power generation engine 241 of the electric power generation unit 240. The attachment shaft 2451 is fixed to the attachment portion 2431 of the electric power generation engine 241. The link member 2114 is swingably attached to an attachment shaft 2455 with interposition of an elastic member 2445, the attachment shaft 2455 being provided in an attachment portion 2111a of the first beam portion 2111. The attachment shaft 2455 is fixed to the attachment portion 2111a of the first beam portion 2111. The link member 2114 is attached to an attachment shaft 2461 provided in an attachment portion 2111b of the first beam portion 2111. The attachment shaft 2461 is supported by a bearing 2471 provided in the link member 2114. The bearing 2471 is disposed such that the link member 2114 rotates about a straight line extending in the left-right direction LR of the straddled vehicle 200 from the center of rotation of the bearing 2471. The attachment shaft 2461 is fixed to the attachment portion 2111b of the first beam portion 2111.

As shown in FIG. 10(b), the link member 2114 is swingably attached to an attachment shaft 2452 with interposition of an elastic member 2442, the attachment shaft 2452 being provided in an attachment portion 2432 of the electric power generation engine 241 of the electric power generation unit 240. The attachment shaft 2452 is fixed to the attachment portion 2432 of the electric power generation engine 241. The link member 2114 is swingably attached to an attachment shaft 2456 with interposition of an elastic member 2446, the attachment shaft 2456 being provided in an attachment portion 2112a of the second beam portion 2112. The attachment shaft 2456 is fixed to the attachment portion 2112a of the second beam portion 2112. The link member 2114 is attached to an attachment shaft 2462 provided in an attachment portion 2112b of the second beam portion 2112. The attachment shaft 2462 is supported by a bearing 2472 provided in the link member 2114. The bearing 2472 is disposed such that the link member 2114 rotates about a straight line extending in the left-right direction LR of the straddled vehicle 200 from the center of rotation of the bearing 2472. The attachment shaft 2462 is fixed to the attachment portion 2112b of the second beam portion 2112.

As shown in FIG. 10(a), a link member 2115 is swingably attached to an attachment shaft 2453 with interposition of an elastic member 2443, the attachment shaft 2453 being provided in an attachment portion 2433 of the electric power generation engine 241 of the electric power generation unit 240. The attachment shaft 2453 is fixed to the attachment portion 2433 of the electric power generation engine 241. The link member 2115 is swingably attached to an attachment shaft 2457 with interposition of an elastic member 2447, the attachment shaft 2457 being provided in an attachment portion 2111c of the first beam portion 2111. The attachment shaft 2457 is fixed to the attachment portion 2111c of the first beam portion 2111. The link member 2115 is attached to an attachment shaft 2463 provided in an attachment portion 2111d of the first beam portion 2111. The attachment shaft 2463 is supported by a bearing 2473 provided in the link member 2115. The bearing 2473 is disposed such that the link member 2115 rotates about a straight line extending in the left-right direction LR of the straddled vehicle 200 from the center of rotation of the bearing 2473. The attachment shaft 2463 is fixed to the attachment portion 2111d of the first beam portion 2111.

As shown in FIG. 10(a), a link member 2116 is swingably attached to an attachment shaft 2454 with interposition of an elastic member 2444, the attachment shaft 2454 being provided in an attachment portion 2434 of the electric power generation engine 241 of the electric power generation unit 240. The attachment shaft 2454 is fixed to the attachment portion 2434 of the electric power generation engine 241. The link member 2116 is attached to an attachment shaft 2464 provided in an attachment portion 2111e of the first beam portion 2111. The attachment shaft 2464 is supported by a bearing 2474 provided in the link member 2116. The bearing 2474 is disposed such that the link member 2116 rotates about a straight line extending in the left-right direction LR of the straddled vehicle 200 from the center of rotation of the bearing 2474. The attachment shaft 2464 is fixed to the attachment portion 2111e of the first beam portion 2111.

The attachment shafts 2451 to 2457, and 2461 to 2464 are pins, for example. The attachment shafts 2451 to 2457, and 2461 to 2464 may be bolts, for example. The axes of the attachment shafts 2451 to 2457, and 2461 to 2464 extend in the left-right direction LR of the straddled vehicle 200. The elastic members 2441 to 2447 are interior-exterior cylinder bushes, for example.

The attachment portions 2431 and 2432 of the electric power generation engine 241 are disposed in a region corresponding to a lower portion and a front portion of the electric power generation engine 241 with respect to the up-down direction UD and the front-back direction FB of the straddled vehicle 200. The attachment portion 2433 of the electric power generation engine 241 is disposed in a region corresponding to an upper portion and a rear portion of the electric power generation engine 241 with respect to the up-down direction UD and the front-back direction FB of the straddled vehicle 200. The attachment portion 2434 of the electric power generation engine 241 is disposed in a region corresponding to the lower portion and the rear portion of the electric power generation engine 241 with respect to the up-down direction UD and the front-back direction FB of the straddled vehicle 200. The attachment portion 2431 is disposed toward the left direction L in the electric power generation engine 241 with respect to the left-right direction LR of the straddled vehicle 200. The attachment portion 2432 is disposed toward the right direction R in the electric power generation engine 241 with respect to the left-right direction LR of the straddled vehicle 200.

The link member 2114 rotates about a straight line extending in the left-right direction LR of the straddled vehicle 200 from the attachment shaft 2461 supported by the bearing 2471 and the attachment shaft 2462 supported by the bearing 2472. The link member 2115 rotates about a straight line extending in the left-right direction LR of the straddled vehicle 200 from the attachment shaft 2463 supported by the bearing 2473. The link member 2116 rotates about a straight line extending in the left-right direction LR of the straddled vehicle 200 from the attachment shaft 2464 supported by the bearing 2474. The link members 2114 to 2116 are attached to the electric power generation engine 241 with interposition of the elastic members 2441 to 2444, respectively. Consequently, the electric power generation engine 241 of the straddled vehicle 200 can suppress transmission of vibration in the up-down direction UD and the front-back direction FB of the straddled vehicle 200 to the frame structure 211 (or to the frame body 2110). If a balancer is provided to the electric power generation engine 241, a primary inertia force of the electric power generation engine 241 is suppressed. Accordingly, in the straddled vehicle 200 of this embodiment, by combined use of the link members 2114 to 2116 and the balancer of the electric power generation engine, transmission of vibration from the electric power generation engine 241 to the frame structure 211 can be suppressed efficiently.

The link member 2114 is attached to the frame body 2110 with interposition of the elastic members 2445 and 2446. The link member 2115 is attached to the frame body 2110 with interposition of the elastic member 2447. Accordingly, in the electric power generation engine 241 of the straddled vehicle 200, the elastic members 2445 to 2447 work as stoppers that suppress excessive swinging, so that large swinging in the up-down direction UD and the front-back direction FB of the straddled vehicle 200 can be suppressed.

In this embodiment, the control unit 252 may or may not be included in the drive unit 250. In other words, in this embodiment, the control unit 252 may be either unified with the drive unit 250 to constitute the rear arm 231, or attached to the frame body 2110 of the straddled vehicle 200.

(Variation)

It may be possible that the drive unit 250 is configured to not include the gear box 253. In a variation of this embodiment, the drive motor 251 is attached to the rear arm 231, and a center shaft of the rear wheel 232 is directly connected to an output shaft of the drive motor 251. That is, the drive motor 251 is configured as an in-wheel motor in the rear wheel 232.

REFERENCE SIGNS LIST 1, 200 straddled vehicle
10, 210 vehicle frame structure
11, 211 frame structure
21, 221 front fork
22, 222 front wheel
31, 231 rear arm
32, 232 rear wheel
40, 240 electric power generation unit
41, 241 electric power generation engine
42, 242 electric power generator
50, 250 drive unit
51, 251 drive motor
52, 252 control unit
53, 253 gear box
60, 260 battery
110, 2110 frame body

The invention claimed is:

1. A straddled vehicle comprising:
a vehicle frame structure that is constituted by a frame body and a drive unit rigidly fixed to each other, the drive unit including a drive motor that receives electric power and outputs power;
a front wheel and a rear wheel, one of which is a driving wheel that receives power outputted from the drive motor, the frame body and the drive unit bearing a first load from the front wheel and bearing a second load from the rear wheel; and
an electric power generation unit, including
an electric power generation engine configured to output engine power, and
an electric power generator that is fixed to the electric power generation engine and is electrically connected to an electric power transfer medium having flexibility, the electric power generator being configured to convert the engine power outputted from the electric power generation engine into the electric power, and to supply the electric power to the drive motor via the electric power transfer medium, wherein
the straddled vehicle is series-hybridized by the drive unit and the electric power generation unit provided therein, and
the electric power generation engine is swingably supported by the vehicle frame structure, such that the engine power outputted by the electric power generation engine is not mechanically supplied to the driving wheel.

2. The straddled vehicle according to claim 1, further comprising a rear arm, the rear arm being supported by the vehicle frame structure via a support portion and being swingable about the support portion, wherein
    the driving wheel is rotatably supported either by the vehicle frame structure or by the rear arm, and
    the electric power generation engine is swingably supported at two or more positions by the vehicle frame structure in a side view of the straddled vehicle, such that the electric power generation engine makes a translational reciprocating motion or a substantially translational reciprocating motion.

3. The straddled vehicle according to claim 2, wherein the electric power generation engine is provided with a balancer.

4. The straddled vehicle according to claim 1, wherein the electric power generation engine is supported, with interposition of elastic members, at two or more positions by the vehicle frame structure in a side view of the straddled vehicle.

5. The straddled vehicle according to claim 4, wherein the electric power generation engine is provided with a balancer.

6. The straddled vehicle according to claim 1, wherein the electric power generation engine is supported, via link members, at three or more positions by the vehicle frame structure in a side view of the straddled vehicle.

7. The straddled vehicle according to claim 6, wherein the electric power generation engine is provided with a balancer.

8. The straddled vehicle according to claim 6, wherein at least one of the link members is attached to either the vehicle frame structure or the electric power generation engine with interposition of an elastic member.

9. The straddled vehicle according to claim 8, wherein the electric power generation engine is provided with a balancer.

10. The straddled vehicle according to claim 1, wherein the drive unit is fixed to the frame body without interposition of any elastic member.

11. The straddled vehicle according to claim 10, further comprises:
    a rear arm that rotatably supports the driving wheel, the rear arm being supported by the vehicle frame structure via a support portion and being swingable about the support portion, and
    a front suspension that rotatably supports the front wheel, the front suspension being supported by the frame body, wherein
    the vehicle frame structure bears the first load from the front wheel via the front suspension and bears the second load from the rear wheel via the rear arm.

12. The straddled vehicle according to claim 11, wherein the vehicle frame structure bears the first load from the front wheel via a first damper of the front suspension, and bears the second load from the rear wheel via a second damper attached to the vehicle frame structure and to the rear arm.

* * * * *